C. D. PLATT.
SWITCH BOX.
APPLICATION FILED DEC. 21, 1917.
1,271,216.
Patented July 2, 1918.
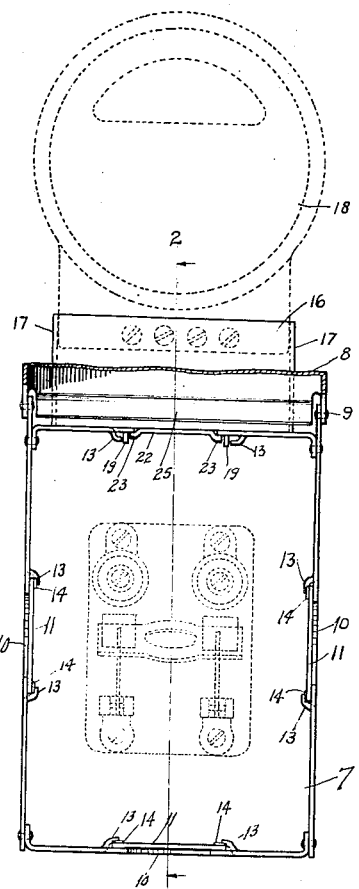
Fig.1
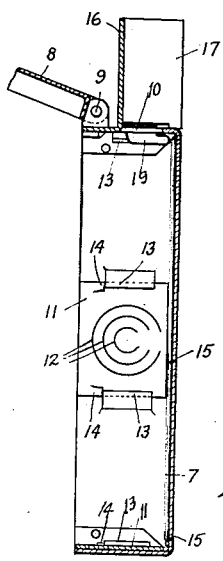
Fig.2
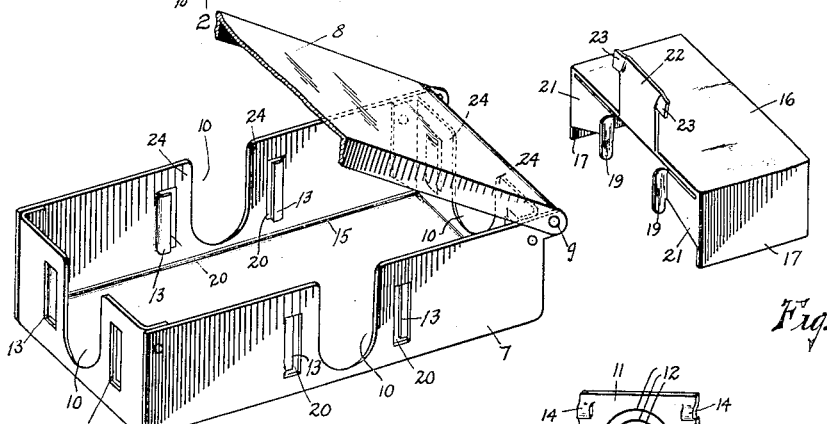
Fig.3
Fig.4
Fig.5
Fig.6
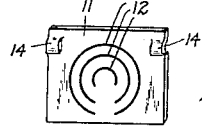
INVENTOR
CLARENCE D. PLATT
BY
ATTORNEY

UNITED STATES PATENT OFFICE.

CLARENCE D. PLATT, OF BRIDGEPORT, CONNECTICUT.

SWITCH-BOX.

1,271,216.  Specification of Letters Patent.  Patented July 2, 1918.

Application filed December 21, 1917. Serial No. 208,220.

*To all whom it may concern:*

Be it known that I, CLARENCE D. PLATT, a citizen of the United States of America, residing at Bridgeport, Conn., have invented a new and useful Switch-Box, of which the following is a specification.

This invention relates to what are commonly termed switch boxes and particularly those which are used in connection with electric meters, the objects of the invention being to provide a practical and efficient boxing for protecting the meter connections.

Another important object of the invention is to provide a form of box construction which may be used as an ordinary switch box, that is, for housing a switch, fuse, or other electrical apparatus and which may also, if desired, be used as a meter box for protecting the connections to an electric meter.

Another object is to provide an adaptable box of this character in which the connections to the meter or other external connections may be made at different sides of the box.

Briefly stated, the invention comprises a box made up of a box body and a suitable cover, said box body having wiring outlets in different sides thereof and having provision for interchangeable connection of cover plates or meter adapters with the different outlets.

Another feature of the invention is the utilization of the cover as a means for securing the cover plates or meter adapters locked to the box body.

Other features and details of construction will appear as the specification proceeds.

In the drawing I have illustrated a practical and commercial embodiment of the invention but I would have it understood that changes and modifications may be made without departing from the true spirit and scope of the invention.

In said drawing:—

Figure 1, is a front view looking into the opened box, the cover being in up-raised or lifted position.

Fig. 2, is a longitudinal sectional view of the box taken substantially on the plane of the line 2—2 of Fig. 1.

Fig. 3, is a perspective view of the box.

Fig. 4, is a detached perspective view of the meter adapter.

Fig. 5, is a sectional view of the box showing a modified construction of meter adapter applied thereto.

Fig. 6, is a detached perspective view of one of the knock-out cover plates.

7 designates the box body and 8 the cover therefor, said cover being here indicated as pivoted to the box body at 9. This box is usually constructed of sheet metal of a size to properly contain the switch or other electrical apparatus.

The box body is preferably formed with a plurality of wiring outlets 10 in different sides thereof for enabling electrical connection being made at any of the several sides of the box. These wiring outlets are shown simply as U-shaped cut-outs formed in the side walls of the box.

Cover plates are provided for the wiring outlets not in use, the same being shown as consisting simply of flat metal plates 11 secured on the inside of the box in position covering the wiring outlets. These cover plates are preferably formed with knockouts 12 and a plurality of concentrically arranged knock-outs are preferably formed in each cover plate so that openings for different sizes of conduit or wiring connections may be readily made, a series of three such concentrically-disposed knock-outs being shown in the illustration.

The means for securing the cover plates in position comprises in each instance a pair of opposed holding jaws 13 disposed at opposite sides of each wiring opening and displaced inwardly into the box a distance sufficient to enable the cover plate being slipped between said jaws and the side of the box, as indicated in Fig. 1. These jaws are preferably of sufficient longitudinal extension to hold the cover plates firmly in position and disposed parallel to each other so as to provide parallel guide-ways for the edge portions of the cover plates.

Stop lugs 14 are shown provided on the cover plates in position to engage with the outward ends of the jaws 13 to limit the inward sliding movements of the cover plates in their guide-ways. These stop lugs are shown formed by partially severing strips of metal at the edges of the cover plate and bending the same outwardly beyond the flat plane of the plate and the stop lugs thus provided are preferably so disposed as to limit the inward movement of the cover plates to a point where the outer edge of the plate will line up with the edge of the box (Fig. 2) and so that the inner edge of the plate will be prevented from contacting with the curve 15 at the junction of the side wall with the back of the box. This curved portion is usually present in sheet metal boxes and if no means were provided to limit the inward movement of the cover plate it would have a wedging effect on the inner end of the cover plate tending to force the cover plate away from the box wall, and thus destroy the close joint between the cover plate and the box body.

The meter adapter is illustrated as a three-sided member adapted for connection with the wall of the box and forming a wiring housing extending from the box over the wiring chamber of the meter. In Fig. 1 I have illustrated how the top and side walls 16 and 17 embrace and cover the wiring chamber of a meter indicated at 18. This adapter or wiring housing is secured to the box body by means of hooks 19 provided on the box-engaging end of the adapter to take into slots provided in the walls of the box body at opposite sides of the wiring openings. These slots are provided in the illustration by punching out the metal of the box body to form the plate holding jaws 13, the inward displacement of said jaws foreshortening the metal of the jaws to such an extent as to provide the parallel slots 20 at the edges of the jaws. Thus by simply striking in the metal of the box body in this fashion, jaws are provided for holding the cover plates and at the same time slots are formed to receive the hooks on the meter adapters.

The hooks on the meter adapters are formed in the illustration, by providing extensions or prolongations 21 on the box-engaging ends of the side walls 17, said extensions being bent angularly to lie flat against the box wall and being again bent angularly at their extreme ends to form the out-standing hooks 19. These hook-supporting extensions are preferably sprung inward slightly so that when the adapter is applied to the box they will act as spring supports for the adapter tending to draw the adapter closely against the box wall. These hook-supporting extensions also constitute flat abutments to give the adapter a firm bearing against the side of the box.

Additional securing means for the meter adapter is provided in the form first illustrated, the same consisting of an up-standing lug or flange 22 struck up from the top of the adapter and provided with lugs 23 at the opposite edges thereof designed to engage with the opposite edge portions 24 at the sides of the wiring opening 10. This flange 22 is shown as of a size to closely fit the outer portion of the wiring opening (see Fig. 1) and the lugs 23 are shown inclined to exert a wedging effect drawing the adapter the more firmly against the box body. The tension of the holding lugs 23 is thus opposed to the tension of the securing hooks 19 so that the adapter is firmly secured to the box body both at the top and the bottom portions thereof.

The adapter is applied to the box body by simply lifting the cover and inserting the up-standing flange of the adapter beneath the dependent flange of the cover, the hooks taking into the slots provided therefor as the wedging lugs 23 become engaged with the edge portions at opposite sides of the wiring open. The adapter is then simply forced downward until the securing hooks and wedging hooks become firmly engaged with their respective seats, this engaging movement being usually limited by the hooks engaging with the lower ends of the slots provided therefor. When the cover is then closed, separation of the adapter from the box body will be positively prevented by reason of the fact that the cover overlies the top of the up-standing flange 22 and the flange of the cover overlies the top 16 of the adapter. In this closed condition of the box also the cover plates are locked in position because the cover then also overlies the outer edges of the plates.

The cover plates and adapter may however be readily removed and interchanged to different sides of the box if desired, when the box is opened. Locking means are usually provided for securing the box in its closed condition so that when thus closed all parts will be locked and the wiring to the meter will be entirely housed and protected.

The form of adapter illustrated in Fig. 5 is in general similar to that described except that the upstanding holding flange is omitted, the adapter being held to the box entirely by the hooks 19 and by the dependent flange 25 of the cover, which in the closed position of the cover over-stands the top of the adapter.

It may be remarked that another advantageous feature of the engagement of the cover with the adapter or cover plates is that said adapter or cover plates may simply be engaged with the box body and then be carried to their final positions by means of the cover, the cover acting as a lever to force them to their respective seats.

From the foregoing it will be apparent that my invention provides a box which can be adapted to meet many different requirements either as a meter protector or as a plain box for housing switches or other electrical apparatus and that when adapted to meet particular requirements, tampering with the box or with the wiring will be effectively prevented.

I claim:—

1. A meter protective box comprising a box body, a cover hinged thereto, said box body having a wiring opening in one side thereof and slots at opposite sides of said wiring opening and a wiring housing adapted to extend from the box body over the wiring chamber of a meter, said housing having hooks on the box end thereof engaging in the slots aforesaid, and said cover overlying the housing to prevent disengagement thereof from the box body when the cover is closed.

2. Meter protective means comprising in combination, a box and a cover hinged thereto, said box having a meter wiring opening in one side thereof and slots at opposite sides of said wiring opening, a wiring housing adapted to project from the box over the wiring chamber of a meter, hooks on the box end of said housing engaging in the slots in the side of the box and a holding member projecting from the housing and engaging the box wall at opposite sides of the wiring opening therein.

3. A meter protective box comprising, a box body provided with a wiring opening in one side thereof and with slots at opposite sides of said wiring opening, a meter wiring housing adapted to extend from the side of the box over the wiring chamber of a meter, hooks on the box end of said housing engaged in the slots aforesaid and a movable cover for the box body overlying said housing.

4. A meter protective box comprising, a box body having a wiring opening in one side thereof and substantially parallel slots at opposite sides of said opening, a meter adapter applied to the box body over said wiring opening provided with hooks on the box-engaging end thereof engaged in said slots and with an up-standing flange disposed in the wiring opening and provided with holding lugs engaging the inner wall of the box body.

5. A meter protective box comprising, a box body having a wiring opening in one side thereof and substantially parallel slots at opposite sides of said opening, a meter adapter applied to the box body over said wiring opening provided with hooks on the box-engaging end thereof engaged in said slots and with an up-standing flange disposed in the wiring opening and provided with holding lugs engaging the inner wall of the box body and a cover for the box body engaging over the top of said flange to prevent separation of the adapter from the box body.

6. A meter protective box comprising, a box body, a meter adapter applied to said box body provided with a hook member engaged with the box body and an up-standing flange on said meter adapter provided with an inclined portion engaging the box body to wedge the adapter into proper engagement with the box body.

7. A meter protective box comprising, a box body provided with a wiring opening in one side thereof and with substantially parallel slots at opposite sides of said wiring opening, a meter adapter applied to the side of the box body over said wiring opening, substantially parallel hooks on the box-engaging end of said adapter engaging in said slots to secure the adapter to the box body and a cover for the box body engaging over a portion of the adapter to prevent separation of the same from the box body.

8. In combination, a switch box having an opening in one side thereof and substantially parallel slots at opposite sides of said opening, opposed inwardly projecting jaws at the opposite sides of said opening, a cover plate engageable beneath said jaws for closing the opening in the side of the box and a wiring cover engageable with the side of the box over the opening therein and provided with substantially parallel hooks on the box-engaging end thereof for engagement in the substantially parallel slots aforesaid.

9. A switch box having openings in different sides thereof and substantially parallel slots at opposite sides of each of said openings, opposed inwardly projecting hooked jaws at opposite sides of each of said openings, cover plates interchangeably engageable beneath said hooked jaws for closing the openings in the different sides of the box and wiring covers adapted for engagement with the different sides of the box over the openings and provided with substantially parallel hooks on the box-engaging end thereof for engagement in the slots at the opposite sides of the openings.

10. In combination, a switch box having an opening in one side thereof and substantially parallel slots at opposite sides of said opening, opposed inwardly projecting jaws at the opposite sides of said opening, a cover plate engageable beneath said jaws for closing the opening in the side of the box and a wiring cover engageable with the side of the box over the opening therein and provided with substantially parallel hooks on the box-engaging end thereof for engagement in the substantially parallel slots aforesaid, said box having a cover adapted to overlie the cover plate or the wiring cover which is engaged with the box.

11. In combination with a box having an opening in one side thereof and opposed holding jaws struck inwardly from the material of the box at opposite sides of the opening therein, a cover plate slidably engaged beneath said opposed holding jaws and having integral stop lugs struck inwardly therefrom and engageable with the ends of the holding jaws for limiting the sliding engagement of the cover plate beneath said jaws.

12. In combination with a box having an opening in one side thereof and opposed holding jaws struck inwardly from the material of the box at opposite sides of the opening therein, a cover plate slidably engaged beneath said opposed holding jaws and having integral stop lugs struck inwardly therefrom and engageable with the ends of the holding jaws for limiting the sliding engagement of the cover plate beneath said jaws and having knock-out sections thereon of graduated size.

13. A box for electrical apparatus of sheet metal and having spaced apart sections thereof severed from the main body of metal and bent parallel to the box wall to thereby provide slots in the box wall and jaws in rear of said slots, a box attachment engageable beneath the jaws so provided on the box wall and a box attachment having hooked portions engageable through the slots provided in the box wall.

14. A meter adapter comprising, a sheet metal member having connected sides and a top forming a housing for the wires between a switch box and meter, the ends of the sides at the box-engaging end of the adapter being bent angularly toward each other and provided on the ends thereof with angularly projecting hooks for engagement with the switch box and the top of the adapter at the box-engaging end thereof having an angularly up-standing flange.

15. A meter adapter comprising, a sheet metal member having connected sides and a top forming a housing for the wires between a switch box and meter, the ends of the sides at the box-engaging end of the adapter being bent angularly toward each other and provided on the ends thereof with angularly projecting hooks for engagement with the switch box, the top of the adapter at the box-engaging end thereof having an angularly up-standing flange and inclined wedge lugs on opposite side portions of said flange.

16. In a device of the character described, a box having a slot and an attachment engageable with said box having a hook engageable in said slot and a spring-support carrying said hook and adapted to draw the attachment yieldingly into engagement with the box.

17. In combination, a box for electrical apparatus provided with a wiring outlet and with slots at opposite sides of said outlet, a wiring cover engageable with the side of the box and provided with hooks on the box-engaging end thereof engageable in said slots, and spring supports for said hooks on the wiring cover, said supports being tensioned to draw the housing toward the box body.

18. In combination, a box for electrical apparatus provided with a wiring outlet and with slots at opposite sides of said outlet, a wiring cover engageable with the side of the box and provided with hooks on the box-engaging end thereof engageable in said slots, spring supports for said hooks on the wiring cover, said supports being tensioned to draw the housing toward the box body, additional holding means for the wiring cover engageable with the box at a point remote from the engagement of the hooks therewith and a spring support for said additional holding means exerting tension to draw the wiring cover toward the box in opposition to the hooks aforesaid.

19. In combination, a box having a wiring outlet and slots at opposite sides of said outlet, a wiring cover comprising a top and sides dependent therefrom, spring extensions on the box-engaging ends of said side walls bent angularly thereto and angularly bent hooks on the ends of said extensions for engagement in the slots in the box.

20. In combination, a box having a wiring outlet and slots at opposite sides of said outlet, a wiring cover comprising a top and sides dependent therefrom, spring extensions on the box-engaging ends of said side walls bent angularly thereto, angularly bent hooks on the ends of said extensions for engagement in the slots in the box, an up-standing flange on the box-engaging end of the top and wedging lugs at opposite edges of said flange engageable with the box at opposite sides of the wiring outlet.

CLARENCE D. PLATT.

DISCLAIMER.

1,271,216.—*Clarence D. Platt*, Bridgeport, Conn. SWITCH-BOXES. Patent dated July 2, 1918. Disclaimer filed November 13, 1920, by the assignee, *The Trumbull Electric Manufacturing Company*, inventor concurring.

Enters this disclaimer-

"As to claim 14, of every meter adapter therein set forth, except such a construction in which the ends of the sides at the box-engaging end of the adapter constitute yielding or spring supports for hooks, and in which said hooks project from the ends of said supports so as to stand at an angle thereto, as distinguished from lying in a plane parallel thereto, and in which such hooks stand out at an angle from said supports so as to be adapted to be hooked into slots formed in the wall of a box to receive such hooks at opposite sides of the wiring opening."

[*Official Gazette November 30, 1920.*]